United States Patent [19]

Ditter et al.

[11] Patent Number: 4,774,038

[45] Date of Patent: Sep. 27, 1988

[54] POLYAMIDE MEMBRANES

[75] Inventors: Jerome F. Ditter, Santa Ana, Calif.; Jeffrey Porter, Tynemouth, United Kingdom

[73] Assignee: Domnick Hunter Filters Limited, Durham County, England

[21] Appl. No.: 27,165

[22] PCT Filed: Jun. 23, 1986

[86] PCT No.: PCT/GB86/00365

§ 371 Date: Feb. 18, 1987

§ 102(e) Date: Feb. 18, 1987

[87] PCT Pub. No.: WO86/07544

PCT Pub. Date: Dec. 31, 1986

[30] Foreign Application Priority Data

Jun. 21, 1985 [GB] United Kingdom ............... 8515819

[51] Int. Cl.$^4$ .............................................. B29C 27/60
[52] U.S. Cl. .......................................... 264/41; 55/16; 55/158; 55/159; 264/344; 521/64
[58] Field of Search ................... 264/41, 344; 521/64

[56] References Cited

U.S. PATENT DOCUMENTS 2,783,894 3/1957 Lovell et al. .......................... 54/64
4,340,479 7/1982 Pall .................................. 210/500.36
4,450,126 5/1984 Kestring ........................... 210/500.38

FOREIGN PATENT DOCUMENTS 1060357 7/1959 Fed. Rep. of Germany .

Primary Examiner—Morton Foelak
Attorney, Agent, or Firm—Bert J. Lewen; Henry Sternberg

[57] ABSTRACT

A method for preparing an alcohol insoluble polymide membrane. An appropriate membrane-forming casting liquid containing the required polyamide is evaporated under conditions of high total humidity and an air flow of less than 305 m/min. (1000 ft/min) in order to form the membrane. Membranes of a single polyamide, e.g. Nylon 6,6 can be formed by the method.

9 Claims, No Drawings

POLYAMIDE MEMBRANES

This invention relates to polyamide membranes and particularly to alcohol-insoluble polyamide membranes and their method of manufacture.

Alcohol-insoluble microporous polyamide membranes are made commercially by two general processes, one a so-called wet process and the other a dry process. In the wet process a membrane forming material is cast as a thin film, either directly into a quenching bath (U.S. Pat. No. 3,876,738) or onto a dry surface for a short time and then into a quenching solution (U.S. Pat. No. 4,340,479). The function of the quenching solution is to remove the non-polyamide ingredients and thereby form the microporous membrane while the material is still in the quench bath. The membrane is removed from the bath, dried and placed on rolls until ready for further handling. Polyhexamethylene adipamide (Nylon 6,6) extrusion grade homopolymer is usually the polyamide of choice because of its superior thermal and chemical stability compared with other types and grades of Nylon. However, it is also known that poly-e-caprolactam (Nylon 6) and polyhexamethylene sebacamide (Nylon 610) can be formed into membranes.

In the dry process (U.S. Pat. No. 4,450,126), the membrane is formed by relatively slow evaporation of the volatile components rather than by rapid quenching. Its advantage lies in the fact that as the membrane reaches the state of nearly complete dryness it can be rolled up as a finished product. In a production line process, the evaporating film is moved through a tunnel, air being blown through the tunnel to assist evaporation.

In U.S. Pat. No. 4,450,126 it is stated that Nylon 6,6 homopolymer did not make a suitable microporous membrane by the dry process, but that a blend of two polymers, one being the usual high molecular weight extrusion grade Nylon 6,6 and the other a Nylon "multipolymer" made a suitable membrane under the experimental conditions disclosed. This multipolymer is a co-polymerized Nylon containing units of nylon 6, 6,6, 610 and 612. It does not possess the thermal or chemical resistance of the extrusion grade Nylon 6,6 and in fact it is even somewhat soluble in alcohols. It had to be used because under the environmental conditions a suitable Nylon 6,6 membrane could not be made. The multipolymer served as a "strengthening and gelation promotor".

On page 3, lines 19 to 25 of U.S. Pat. No. 4,450,126 it is stated that Nylon 6,6 used by itself does undergo gelation, but "it does so after a skin has formed and hence the resultant membrane exhibits high resistance to flow and is of no utility for microfiltration applications." Likewise, homopolymer Nylon 6,6 membranes produced by the dry process are weak and brittle, rather than strong and flexible.

Examples 1 and 2 of U.S. Pat. No. 4,450,126 reiterate these conclusions. On page 7, line 5 it is stated, with reference to Nylon 6,6 membranes made by the dry process, "the homopolymer membranes apparently require a double layer to ensure sterilization efficiency." The one claim is for the dry process preparation of a membrane comprised of two polymers, one extrusion grade Nylon 66 homopolymer and the other the aforesaid multipolymer.

The present invention is concerned with a dry process method that can be used to prepare good quality self-supporting membranes from most, if not all, alcohol insoluble polyamide including Nylon 6,6 alone, in contrast to the prior art methods.

According to the present invention there is provided a method for preparing an alcohol insoluble polyamide membrane, the method comprising evaporating an appropriate membrane-forming casting liquid containing the required polyamide under conditions of high total humidity and an air flow of less than 305 m/min. (1000 ft/min) across the membrane during its formation.

The total humidity is preferably from 0.25 to 0.90 g/mole of air, more desirably from 0.60 to 0.90 g/mole of air.

The air flow is preferably less than 153 m/min (500 ft/min), and more desirably from 46 to 92 m/min (150 to 300 ft/min). The air flow is measured as the linear velocity of air relative to the surface of the casting liquid in the vicinity of that surface, and is usually measured some 5 to 7.5 cm (2 to 3 inches) above the surface. The pore size of the finished membrane is in some measure dependent on the air flow, with higher air flow leading to membranes of tight formulation with small pores and high bubble points.

The method is, most surprisingly, capable of giving good results when the polyamide contained in the liquid is solely an extrusion grade Nylon 6,6 hompolymer. It is, however, not limited to such material and, for example, it is possible to use polytetramethylene adipamide (Nylon 4,6) or blends of any two or all three types of Nylon 6,6, Nylon 4,6 and Nylon 6. Indeed it is thought that most if not all alcohol-insoluble Nylons can be cast into self-supporting membranes using the technique of the invention, with proper control of the process variables within the given parameters.

The membrane forming liquid will usually include formic acid as a solvent for the polyamide. Other solvents may conceivably be used, but formic acid is generally regarded as the most acceptable in the membrane-forming art. The solvent may be present together with one or more co-solvents such as water, methanol, glycerol or any other lower molecular weight alcohol.

Examples to illustrate the present invention will now be described.

Examples 1 and 2 illustrate the following formulations, all parts being given by weight.

| Ingredient | Example 1 | Example 2 |
|---|---|---|
| Maranyl A-150 | 10.52 | 14.02 |
| Allied 8202 | 3.50 | — |
| Water (as co-solvent) | 6.49 | 6.49 |
| Formic Acid | 72.39 | 72.39 |
| Post-Additives: | | |
| Acetic Acid | 3.25 | 3.25 |
| Glycerine | 1.95 | 1.95 |
| Water (non-solvent) | 1.90 | 1.90 |

In the above table, the reference to Maranyl A-150 is to an extrusion grade Nylon 6,6 polymer from I.C.I. and Allied 8202 is an injection mould grade Nylon 6 from Allied Polymers. Example 2 contained only the nylon 6,6 polymer whereas Example 1 contained a 3:1 blend of nylon 6,6 and nylon 6.

After the formulations had been properly mixed and formed into casting solutions, they were each hand cast to form seven membrane samples (1A to 1G from the Example 1 formulation and 2A to 2G from the Example 2 formulation) on a Mylar polyester substrate and dried in an air flow of approximately 53 m/min (175 ft/min) under a variety of temperature and relative humidity conditions as shown in the following table. The membranes were removed from the substrate and found to be self-supporting. The table also shows test results on each of the membranes after its removal from the substrate, indicating the thickness of each membrane, the rate of flow of air through each membrane, the rate of flow of water through each membrane and the bubble point of each membrane. Thickness, air flow rate and bubble point figures shown in the table are an average of three readings, taken at an upstream region, a centre region and a downstream region of the membrane. Air flow rate was measured at a differential pressure of 68.95 kN/m$^2$ (10 psi). The water flow rate was measured through a 47 mm diameter disc in the centre of each sample, at 20° C. with a differential pressure of 52 cm of mercury.

| Sample No. | Casting Conditions | | Test Data | | | |
|---|---|---|---|---|---|---|
| | Temperature | Relative Humidity | Thickness (mm) | Air Flow (l/cm$^2$/min) | Water Flow (ml/cm$^2$/min) | Bubble Point (kN/m$^2$) |
| 1-A | 24° C. | 68% | 0.104 | 2.75 | 19.9 | 331 |
| 2-A | 24° C. | 68% | 0.10 | 2.08 | 13.5 | 348 |
| 1-B | 24° C. | 75% | 0.112 | 2.46 | 14.0 | 331 |
| 2-B | 24° C. | 75% | 0.102 | 3.35 | 23.0 | 300 |
| 1-C | 24° C. | 82% | 0.112 | 3.64 | 23.5 | 283 |
| 2-C | 24° C. | 82% | 0.102 | 3.44 | 22.7 | 296 |
| 1-D | 35° C. | 61% | 0.117 | 3.93 | 22.6 | 283 |
| 2-D | 35° C. | 61% | 0.109 | 3.61 | 21.6 | 290 |
| 1-E | 35° C. | 68% | 0.117 | 3.35 | 21.4 | 296 |
| 2-E | 35° C. | 68% | 0.107 | 3.64 | 23.4 | 290 |
| 1-F | 35° C. | 75% | 0.114 | 3.93 | 24.5 | 279 |
| 2-F | 35° C. | 75% | 0.112 | 3.64 | 25.2 | 283 |
| 1-G | 40° C. | 50% | 0.109 | 3.93 | 24.3 | 276 |
| 2-G | 40° | 50% | 0.104 | 3.35 | 31.1 | 290 |

It will be seen from the above table that it is the total humidity of the air (rather than the relative humidity) that is important, since as the temperature is raised the relative humidity can be lowered with essentially the same result in the properties of the finished membrane.

Each of the cast membranes was self-supporting, microporous, unskinned and hydrophilic, and was suitable for use as a filter medium for removing suspended particles and micro-organisms from fluids.

Various substitutions for the co-solvents and for the post additives can be made without creating skinning effects or poor quality membranes. By way of example, glycerol, methanol or any lower molecular weight alcohol may be substituted for water as co-solvent, a halocarbon may be substituted for all of the post additives, or all post additives may be omitted. The important factors are high total humidity in the air and a relatively low air flow across the curing membrane material.

The membranes of the foregoing examples have bubble points in the range of from 276 to 348 kN/m$^2$, but the method may be used to produce membranes covering a large range of bubble points from in excess of 414 kN/m$^2$ down to 54 kN/m$^2$ this range covering most of the practical range of microporous membranes.

Further examples of membranes, formed by a machine casting process, are given below.

| FORMULATIONS (parts by weight) | | | | | | |
|---|---|---|---|---|---|---|
| | Example | | | | | |
| Ingredient | 3 | 4 | 5 | 6 | 7 | 8 |
| ICI A-150 | 15.02 | 14.52 | 14.02 | 13.52 | 13.02 | 12.52 |
| Water (as co-solvent) | 6.95 | 6.72 | 6.49 | 6.26 | 6.03 | 5.80 |
| Formic Acid | 70.42 | 71.40 | 72.39 | 73.38 | 74.36 | 75.34 |
| Post Additives: | | | | | | |
| Acetic Acid | 3.48 | 3.37 | 3.25 | 3.13 | 3.02 | 2.90 |
| Glycerine | 2.09 | 2.02 | 1.95 | 1.88 | 1.81 | 1.74 |
| Water (non-solvent) | 2.04 | 1.97 | 1.90 | 1.83 | 1.76 | 1.70 |

| Ingredients | 9 | 10 | 11 | 12 | 13 |
|---|---|---|---|---|---|
| ICI A-150 | 12.02 | 11.52 | 11.02 | 10.52 | 140.2 |
| Water (as co-solvent) | 5.56 | 5.33 | 5.10 | 4.87 | 64.9 |
| Formic Acid | 76.33 | 77.32 | 78.31 | 79.28 | 723.9 |
| Post Additives: | | | | | |
| Acetic Acid | 2.79 | 2.67 | 2.55 | 2.44 | 32.5 |
| Glycerine | 1.67 | 1.60 | 1.53 | 1.46 | 19.5 |
| Water (non-solvent) | 1.63 | 1.56 | 1.49 | 1.43 | 19.0 |

The formulations were each machine cast through a spreader gap of 0.46 mm (0.018 inch) onto a Mylar polyester substrate moving through a drying tunnel approximately 4.57 m in length at a speed of 15.25 cm/min (0.5 ft/min). The temperature at the entrance to the tunnel was 35° C., the air velocity over the surface of the material was 45.7 m/min (150 ft/min) and the relative humidity was 60%. The membranes emerged from the tunnel fully formed, and were then passed through a further tunnel of similar length, in which they were subjected to a heated air flow to complete drying.

Finished membranes from these runs were tested, with the results shown below, test conditions being as stated for Examples 1 and 2.

| Test Results (Averages of two points each) | | | | | |
|---|---|---|---|---|---|
| Example No. | Thickness (mm) | Air Flow (l/cm$^2$/min) | Water Flow (ml/cm$^2$/min) | Bubble Point (kn/m$^2$) | Comments |
| 3 | 0.136 | 1.33 | 7.9 | 427 | |
| 4 | 0.123 | 1.13 | 7.8 | 476 | |
| 5 | 0.126 | 1.45 | 10.2 | 427 | |
| 6 | 0.119 | 2.66 | 16.7 | 331 | 0.2 pore size |
| 7 | 0.130 | 4.19 | 25.1 | 248 | 0.45 pore size |
| 8 | 0.126 | 6.36 | 44.3 | 186 | 0.65 pore size |
| 9 | 0.124 | 10.17 | 65.1 | 145 | |
| 10 | 0.121 | 14.39 | 82.3 | 121 | |
| 11 | 0.118 | 20.35 | 109.9 | 91 | 1.2 pore size |

-continued

| Test Results (Averages of two points each) | | | | | |
|---|---|---|---|---|---|
| Example No. | Thickness (mm) | Air Flow (l/cm²/min) | Water Flow (ml/cm²/min) | Bubble Point (kn/m²) | Comments |
| 12 | 0.114 | — | 213.2 | 54 | (fragile) 3.0 pore size |
| 13.A | 0.135 | 2.28 | 15.0 | 338 | (v, fragile) 0.2 pore size |
| 13.B | 0.136 | 2.20 | 15.1 | 338 | |

Each membrane was self-supporting, microporous, unskinned and hydrophilic, and was suitable for use in microfiltration.

The foregoing examples have all used Nylon 6,6 as the principal polyamide in the casting solution; the following examples illustrate the use of other polyamide solutions.

| FORMULATIONS (Parts by Weight) | | | | | |
|---|---|---|---|---|---|
| | Example | | | | |
| INGREDIENT | 14 | 15 | 16 | 17 | 18 |
| MARANYL A150 | — | — | — | 10.5 | 10.5 |
| STANYL | 16.0 | 14.0 | 14.0 | 3.5 | 3.5 |
| H₂O } as co-solvent | 6.7 | 8.0 | 8.0 | 6.3 | — |
| METHANOL | — | — | — | — | 6.5 |
| FORMIC ACID | 70.1 | 70.9 | 70.9 | 72.4 | 72.4 |
| Post Additives: | | | | | |
| ACETIC ACID | 3.0 | 3.25 | 1.75 | 3.25 | 3.25 |
| GLYCERINE | 2.2 | 1.95 | 3.45 | 1.95 | 1.95 |
| WATER (non-solvent) | 2.0 | 1.9 | 1.9 | 1.9 | 1.90 |

Stanyl is a polytetramethylene adipamide (Nylon 4,6) produced by DSM in Holland.

The above formulations were mixed and formed into casting solutions and were then hand cast on to Mylar polyester substrate and dried in an air flow of approximately 128 m/min at 20° C. with a relative humidity of 80%, a total humidity value of 0.4 g/mole of air.

The thickness of the samples were measured, and water flow and bubble point were also measured using the methods already described. The results are shown below.

| TEST RESULTS | | | |
|---|---|---|---|
| EXAMPLE | THICKNESS (mm) | WATER FLOW (ml/min/cm²) | BUBBLE POINT (kN/m²) |
| 14 | 0.165 | 1.9 | 317 |
| 15 | 0.157 | 20.1 | 179 |
| 16 | 0.178 | unobtained | 214 |
| 17 | 0.216 | 18.7 | 262 |
| 18 | 0.165 | 7.3 | 455 |

Each membrane was self-supporting, microporous, unskinned and hydrophilic, and was suitable for use in microfiltration.

We claim:

1. A method for preparing an alcohol insoluble polyamide membrane, the method comprising evaporating an appropriate membrane-forming casting liquid containing the required polyamide under conditions of high total humidity and an air flow of less than 305 m/min. (1000 ft/min) across the membrane during its formation.

2. A method according to claim 1 in which the total humidity is from 0.25 to 0.90 g/mole of air.

3. A method according to claim 1 in which the total humidity is from 0.60 to 0.90 g/mole of air.

4. A method according to claim 1 in which the air flow is less than 153 m/min.

5. A method according to claim 4 in which the air flow is from 46 to 92 m/min.

6. A method according to claim 1 in which the only polyamide in the casting liquid is extrusion grade polyhexamethylene adipamide.

7. A method according to claim 1 in which the only polyamide in the casting liquid is polytetramethylene adipamide.

8. A method according to claim 1 in which the polyamide in the casting liquid is a blend of at least two polyamides selected from polyhexamethylene adipamide polytetramethylene adipamide and poly-e-caprolactam.

9. A method according to claim 1 in which the casting liquid contains formic acid as solvent for the polyamide, together with at least one co-solvent selected from water, methanol and glycerol.

* * * * *